(12) United States Patent
Tiar

(10) Patent No.: US 6,837,667 B2
(45) Date of Patent: Jan. 4, 2005

(54) APPARATUS FOR DRAWING A WHEEL IN AND OUT RELATIVE TO A VEHICLE

(76) Inventor: Eli Tiar, P.O.B 20, Moshavramatzvi (IL), 19125

( * ) Notice: Subject to any disclaimer, the term of this patent is extended or adjusted under 35 U.S.C. 154(b) by 77 days.

(21) Appl. No.: 10/271,200

(22) Filed: Oct. 15, 2002

(65) Prior Publication Data
US 2004/0071536 A1 Apr. 15, 2004

(51) Int. Cl.$^7$ ............................................... B62D 43/00
(52) U.S. Cl. ........................................................ 414/463
(58) Field of Search ....................... 414/463; 224/42.23, 224/42.24, 42.12; 254/323

(56) References Cited

U.S. PATENT DOCUMENTS

| | | | | |
|---|---|---|---|---|
| 1,983,767 A | * | 12/1934 | Mueller ...................... | 414/463 |
| 2,400,274 A | * | 5/1946 | Ullman ....................... | 414/463 |
| 3,554,397 A | * | 1/1971 | Cluff .......................... | 414/463 |
| 3,556,325 A | * | 1/1971 | Leahy et al. ................ | 414/463 |
| 3,734,323 A | * | 5/1973 | Price et al. ................. | 414/463 |
| 3,865,264 A | * | 2/1975 | Kuhns ........................ | 414/463 |
| 4,329,107 A | | 5/1982 | Smith | |
| 4,537,555 A | * | 8/1985 | Combs ........................ | 414/463 |
| 4,609,025 A | * | 9/1986 | Messenger .................... | 157/1 |
| 4,768,361 A | * | 9/1988 | Derman ........................ | 70/259 |
| 5,238,358 A | * | 8/1993 | Higgins et al. .............. | 414/463 |
| 5,638,710 A | * | 6/1997 | Howard et al. ................ | 70/259 |
| 5,718,553 A | * | 2/1998 | Via et al. ..................... | 414/463 |
| 5,871,327 A | * | 2/1999 | McWha ....................... | 414/463 |
| 5,975,498 A | * | 11/1999 | Sauner ....................... | 254/323 |
| 6,142,449 A | | 11/2000 | Aldridge et al. | |
| 6,390,760 B1 | * | 5/2002 | Affer et al. .................. | 414/463 |
| 6,561,489 B1 | * | 5/2003 | Wakefield .................... | 254/323 |

* cited by examiner

Primary Examiner—Douglas Hess
(74) Attorney, Agent, or Firm—Katten Muchin Zavis Rosenman

(57) ABSTRACT

An apparatus for enabling a user to draw in and raise, and to lower and draw out, a spare wheel that is normally stored under a vehicle. The apparatus includes a chain having a first chain end and a second chain end for securing and manipulating the spare wheel. The apparatus also includes a bracket attached across the mounting hole of the spare wheel, wherein the first chain end and second chain end are attached to the bracket, a winch to control the movements of the chain, the winch positioned at the drawn out position for the spare wheel, a roller positioned at the drawn in position of the spare wheel and an operating handle for attachment to the winch, whereby the user turns the operating handle to control the movements of the winch, and thereby draws in and raises, and alternatively lowers and draws out, the spare wheel that is normally stored under the vehicle.

3 Claims, 6 Drawing Sheets

APPARATUS FOR DRAWING A WHEEL IN AND OUT RELATIVE TO A VEHICLE

FIELD OF THE INVENTION

The present invention relates to apparatus for drawing in and out a wheel. More particularly the present invention relates to apparatus, which enable the drawing in and raising, and lowering and drawing out, of a spare wheel that is stored under a vehicle.

BACKGROUND OF THE INVENTION

When a flat tire occurs a driver is frequently faced with difficult circumstances for removing the spare wheel and tire from storage, and changing the spare. Weather conditions, darkness and hostile denizens and terrain can be daunting. At such times any apparatus that simplifies the storage and retrieval of the spare is especially appreciated.

Several apparatus are known in the art for securing and retrieving a spare tire under a vehicle. Smith, in U.S. Pat. No. 4,329,107 discloses a wire rope spare tire carrier having a first pulley and a second pulley for raising and lowering the spare wheel. Combs, in U.S. Pat. No. 4,537,555 describes a wire rope spare tire carrier having a pulley and a roll bar for raising and lowering the spare wheel, as well as locking the wheel in place. In U.S. Pat. No. 5,975,498 Sauner has invented a wheel and spare tire assembly for raising and lowering the spare wheel, which includes a secondary cable for securing the wheel in case of failure of the primary means. In U.S. Pat. No. 6,142,449 Aldridge et al discloses a wheel and spare tire assembly for raising and lowering the spare wheel, which includes a catch member for securing the wheel in case of failure of the primary means.

Thus, there is very little improvement or differentiation between prior art apparatus. The driver is still required to get under the vehicle to both retrieve the spare wheel once it has been lowered to the ground, and in order to return it to its secured position.

SUMMARY OF THE INVENTION

Accordingly, it is a principal object of the present invention to overcome the limitations of prior art spare wheel lowering and raising apparatus, and provide an apparatus that solves the above problems for improving the convenience of the driver.

It is also an object of the present invention to provide an apparatus that allows drawing out the spare wheel, as well as lowering it to the ground.

It is another object of the present invention to provide an apparatus that allows drawing back in of the spare wheel into position below its storage location, before raising it for return to its secure storage location.

An apparatus is described for enabling a user to draw in and raise, and to lower and draw out, a spare wheel that is normally stored under a vehicle. The apparatus includes a chain having a first chain end and a second chain end for securing and manipulating the spare wheel. The apparatus also includes a bracket attached across the mounting hole of the spare wheel, wherein the first chain end and second chain end are attached to the bracket, a winch to control the movements of the chain, the winch positioned at the drawn out position for the spare wheel, a roller positioned at the drawn in position of the spare wheel and an operating handle for attachment to the winch, whereby the user turns the operating handle to control the movements of the winch, and thereby draws in and raises, and alternatively lowers and draws out, the spare wheel that is normally stored under the vehicle.

Additional features and advantages of the invention will become apparent from the following drawings and description.

BRIEF DESCRIPTION OF THE DRAWINGS

The features of the disclosed system will become more readily apparent, and may be better understood, by referring to the following detailed description of an illustrative embodiment of the present invention, taken in conjunction with the accompanying drawings, where.

DETAILED DESCRIPTION OF THE PREFERRED EMBODIMENTS

The invention will now be described in connection with certain preferred embodiments with reference to the following illustrative figures so that it may be more fully understood. References to like numbers indicate like components in all of the figures.

Figure 1:
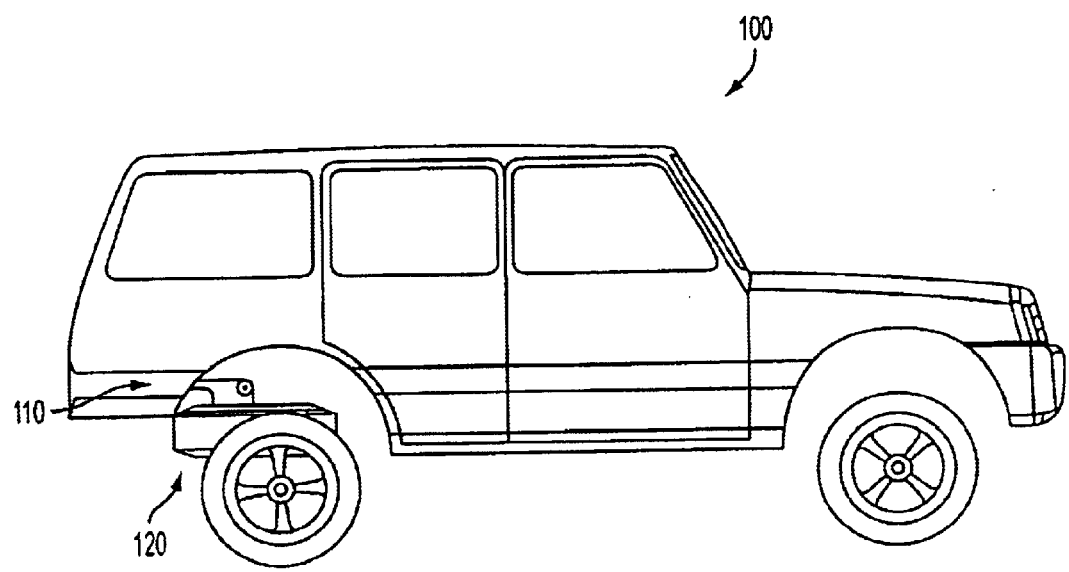
FIG. 1 is an illustration of a vehicle and an apparatus for retrieving and storing a spare wheel, where the wheel is shown secured in storage under the vehicle, in accordance with the principles of the present invention.

FIG. 1 is an illustration of the vehicle 100 and the apparatus 110 for retrieving and storing a spare wheel 120, where spare wheel 120 is shown secured in storage under vehicle 100, in accordance with the principles of the present invention.

Figure 2:
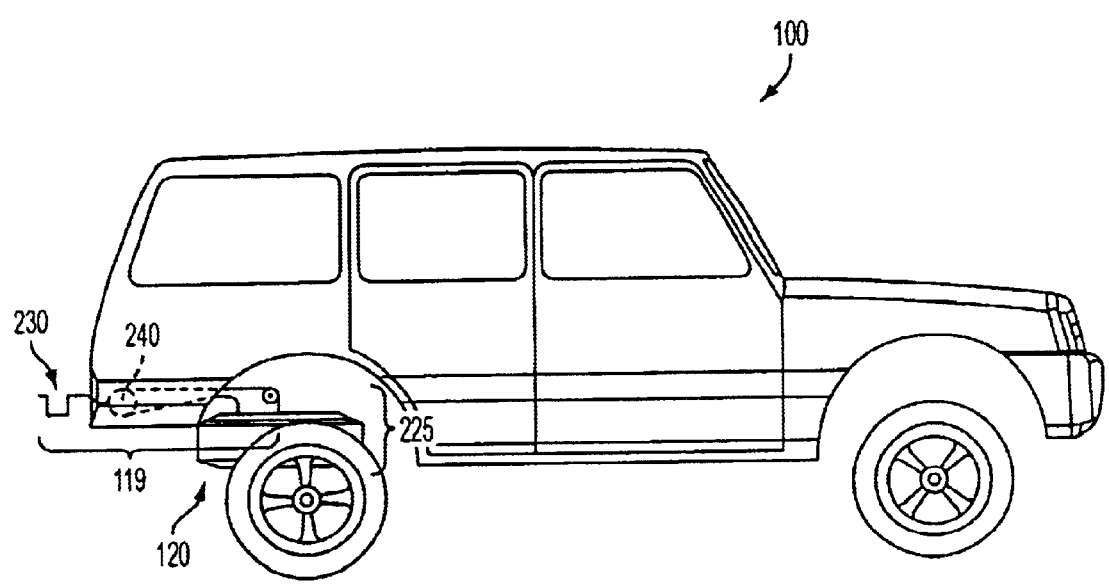
FIG. 2 is an illustration of a vehicle and an apparatus for retrieving and storing a spare wheel, where the operating handle is shown attached to the apparatus in the secured position, in accordance with the principles of the present invention.

FIG. 2 is an illustration of vehicle 100 and apparatus 110 for retrieving and storing a spare wheel, where an operating handle 230 is shown attached to apparatus 110 in the secured position 225, in accordance with the principles of the present invention. Operating handle 230 is shown attached to a winch 240 from the rear. Alternatively, operating handle 230 can be attached to winch 240 from the side, i.e., pointing into FIG. 2.

Figure 3:
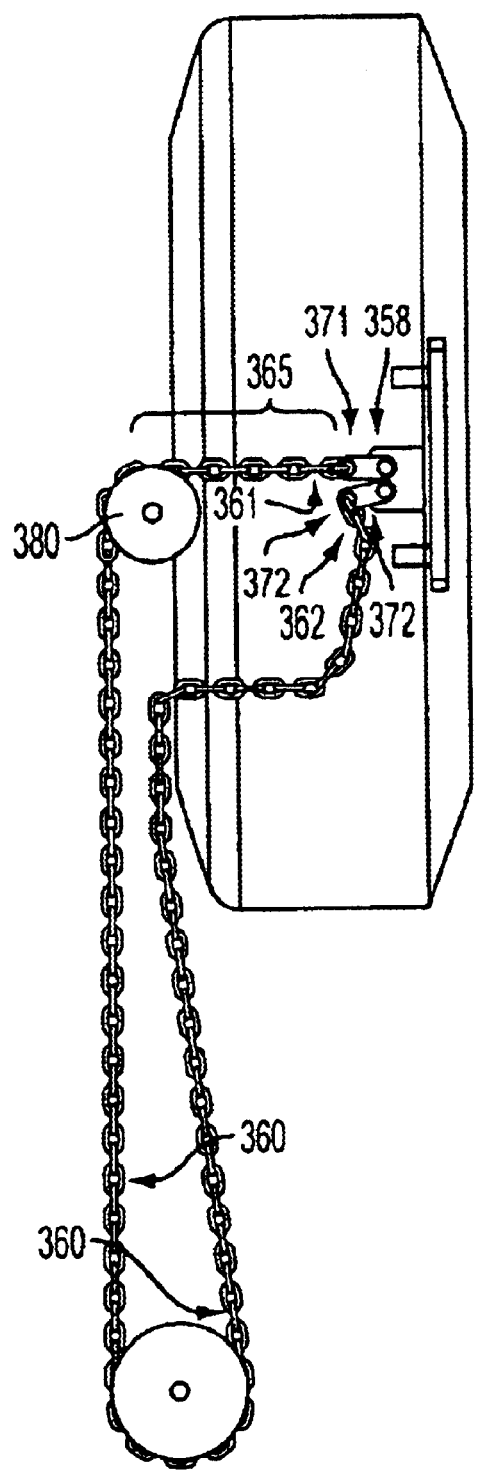
FIG. 3 is an illustration of an apparatus for retrieving and storing a spare wheel, where the details of the apparatus are shown in the secured position, in accordance with the principles of the present invention.

FIG. 3 is an illustration of apparatus for retrieving and storing a spare wheel 120, where the details of apparatus 110 are shown in the secured position, in accordance with the principles of the present invention. A bracket 350 is shown attached across the mounting hole of spare wheel 120. A stud 355 serves to attach a first chain end 361 and a second chain end 362 of a chain 360 to a first solid pivot link 371 and a second solid pivot link 372, respectively. Chain 360 is wrapped around a roller 380 for lowering and raising spare wheel 120 between secured position 225 and the ground. As operating handle 230 is turned in a clockwise direction, the forward vertical section 365 of chain 360 is extended downwards so as to lower spare wheel 120 to the ground.

Figure 4:
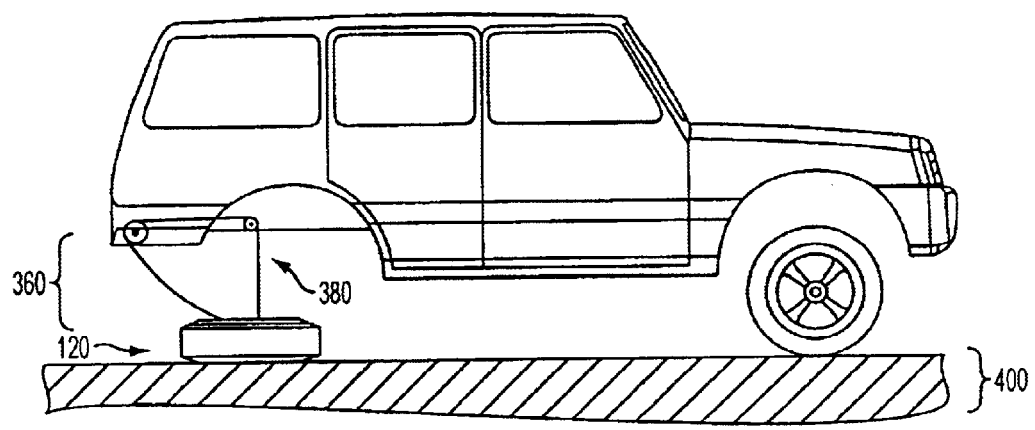
FIG. 4 is an illustration of an apparatus for retrieving and storing a spare wheel, where the spare wheel is shown in the initial lowered position, in accordance with the principles of the present invention.

FIG. 4 is an illustration of an apparatus for retrieving and storing a spare wheel, where the spare wheel is shown in the initial lowered position, in accordance with the principles of the present invention. As operating handle 230 (not shown in FIG. 4) is turned in a clockwise direction, the forward vertical section 365 of chain 360 is extended downwards so as to lower spare wheel 120 to the ground 400.

Figure 5:
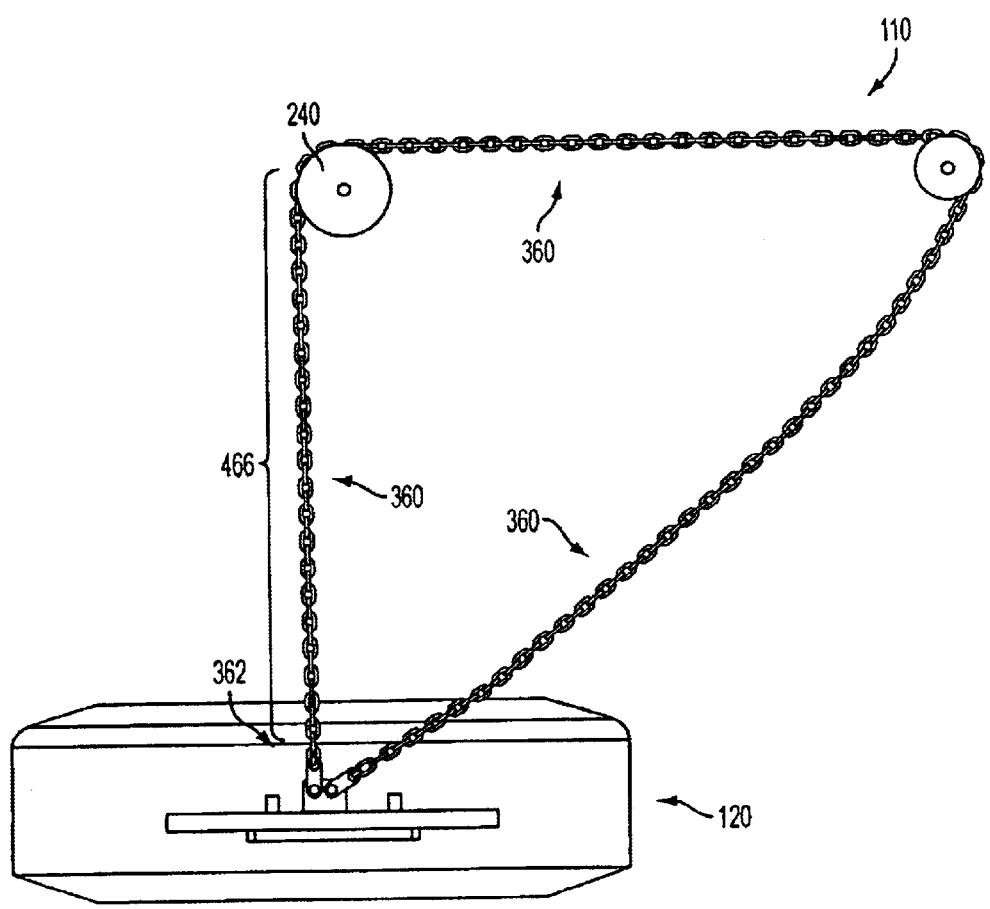
FIG. 5 is an illustration of an apparatus for retrieving and storing a spare wheel, where the details of the apparatus are shown in the lowered position, and the wheel has been drawn out from under the vehicle, in accordance with the principles of the present invention.

FIG. 5 is an illustration of apparatus 110 for retrieving and storing a spare wheel 120, where the details of apparatus 110 are shown in the final lowered position, in accordance with the principles of the present invention. After reaching the initial lowered position of FIG. 4, continued clockwise cranking takes up the slack in the rearward portion 466 of chain 360 between winch 240 and second chain end 362. As clockwise turning continues further, rearward portion 466 of chain 360 becomes taut, thereafter exerting a rearward force vector on spare wheel 120, thereby dragging it along ground 400 to the rear of vehicle 100 in the position shown in FIG. 5.

Figure 6:
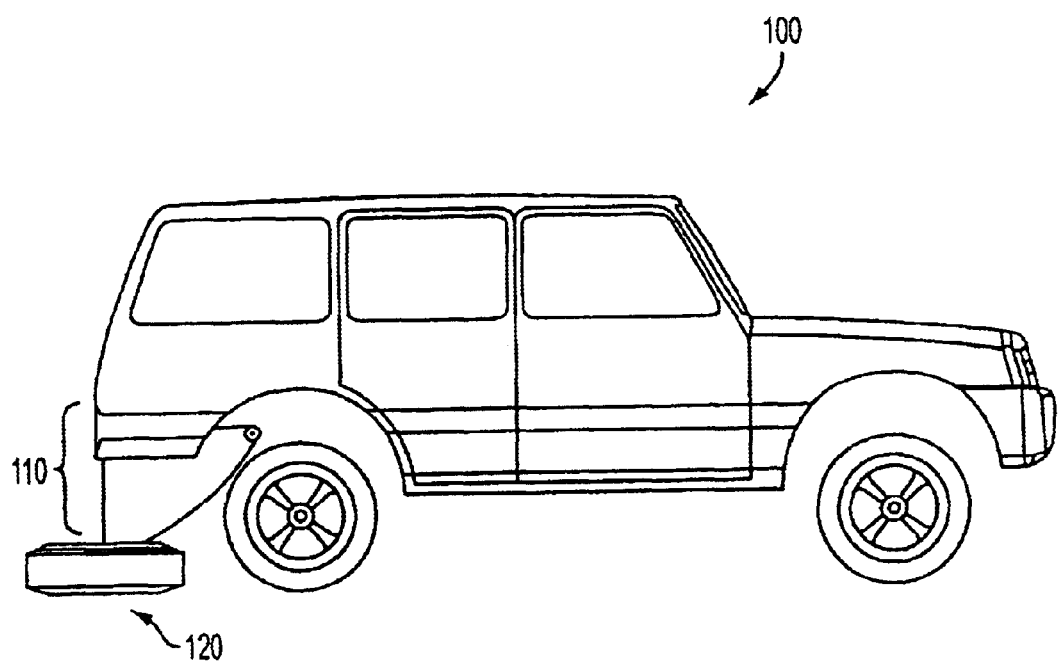
FIG. 6 is an illustration of a vehicle and an apparatus retrieving and storing a spare wheel, where the wheel is shown lowered to the ground and drawn out from under the vehicle, in accordance with the principles of the present invention.

FIG. 6 is an illustration of vehicle 100 and apparatus 110 for retrieving and storing spare wheel 120, where spare wheel 120 is shown lowered to the ground and drawn out from under vehicle 100, in accordance with the principles of the present invention.

I claim:

1. An apparatus for enabling a user to draw in and raise, and to lower and draw out, a spare wheel that is normally stored under a vehicle, comprising:

a chain having a first chain end and a second chain end for securing and manipulating the spare wheel;

a bracket attached across a mounting hole of the spare wheel, wherein said first chain end and said second chain end are attached to said bracket;

a winch to control the movements of said chain, said winch positioned at the drawn out position for the spare wheel;

a roller positioned at the drawn in position of the spare wheel; and an operating handle for attachment to said winch, whereby the user turns said operating handle to control the movements of said winch, and thereby draws in and raises, and alternatively lowers and draws out, the spare wheel that is normally stored under the vehicle.

2. The apparatus according to claim 1, wherein said operating handle is attached from the side of the vehicle.

3. The apparatus according to claim 1, wherein said operating handle is attached from the rear of the vehicle.

* * * * *